United States Patent [19]
Barney et al.

[11] Patent Number: 4,760,396
[45] Date of Patent: Jul. 26, 1988

[54] APPARATUS AND METHOD FOR ADJUSTING SET CLEARANCE ALTITUDE IN A TERRAIN FOLLOWING RADAR SYSTEM

[75] Inventors: George M. Barney, Dallas; Bryan A. Stickel, Garland, both of Tex.

[73] Assignee: Merit Technology Incorporated, Plano, Tex.

[21] Appl. No.: 884,388

[22] Filed: Jul. 11, 1986

[51] Int. Cl.$^4$ .................................... G01S 13/08
[52] U.S. Cl. .................................... 342/65
[58] Field of Search .................................... 342/65

[56] References Cited

U.S. PATENT DOCUMENTS

| | | | |
|---|---|---|---|
| 3,315,255 | 4/1967 | Sullivan et al. | 342/65 |
| 3,404,398 | 10/1968 | Hoban et al. | 342/65 |
| 3,530,465 | 9/1970 | Treffeisen et al. | 342/65 |
| 3,795,999 | 3/1974 | Vehrs, Jr. | 342/65 |
| 3,815,132 | 6/1974 | Case, Jr. et al. | 342/65 |
| 4,058,710 | 11/1977 | Altmann | 342/65 X |
| 4,144,571 | 3/1979 | Webber | 342/65 X |
| 4,224,669 | 9/1980 | Brame | 342/65 X |
| 4,520,445 | 5/1985 | Kearns | 342/65 X |
| 4,567,483 | 1/1986 | Bateman et al. | 342/65 X |

*Primary Examiner*—T. H. Tubbesing
*Assistant Examiner*—John B. Sotomayor
*Attorney, Agent, or Firm*—W. Kirk McCord

[57] ABSTRACT

An apparatus and method for adjusting set clearance altitude of an aircraft to control the aircraft to fly along a predetermined path relative to the terrain below. A terrain following radar system and a stored terrain elevation data base are used to determine the respective positions and elevations of selected portions of the terrain downrange from the aircraft. This information is used along with pre-stored information relating to the ability of a ground threat to detect the aircraft and the roughness of the terrain to compute three different altitudes. The first altitude (Ia) represents the maximum height at which the aircraft can fly without being detected by the ground threat. The second altitude (Da) represents the maximum desired altitude of the aircraft at any time during a flight. The third altitude (Ra) represents the minimum altitude at which the aircraft is allowed to fly. The set clearance altitude is determined for each of the selected positions on the terrain by first comparing Ia and Da and taking the lesser altitude as between the two. The lesser altitude is then compared with Ra and the greater of those two values is selected as the set clearance altitude. Set clearance altitude is one of the variables used to determine the desired vertical flight vector angle of the aircraft to control the aircraft to fly along a path corresponding to the respective set clearance altitudes above the terrain.

12 Claims, 5 Drawing Sheets

APPARATUS AND METHOD FOR ADJUSTING SET CLEARANCE ALTITUDE IN A TERRAIN FOLLOWING RADAR SYSTEM

FIELD OF THE INVENTION

This invention relates to terrain following radars and stored terrain data bases and in particular to an apparatus and method for dynamically adjusting the set clearance altitude in a terrain following system.

BACKGROUND OF THE INVENTION

Terrain following radars, threat information and stored terrain data bases are typically used on military aircraft to supply information to the aircraft pilot, or autopilot system when the autopilot system is in use, to permit or require the aircraft to fly along a path which approximates the contour of the terrain below, at a predetermined elevation above the terrain. When the aircraft is flying a mission in hostile territory, it has a greater chance of avoiding detection by the enemy by flying low over the terrain. Although the probability of detection is minimized by flying low, the danger of crashing into elevated terrain is increased, particularly when the terrain is rough. Terrain following radars are described in greater detail in U.S. Pat. Nos. 3,277,467; 3,397,397; 3,623,093; 3,657,719; 3,739,380; 3,795,909; 3,815,132; and 4,016,565.

DESCRIPTION OF THE PRIOR ART

According to prior practice, terrain following radars are used in association with data bases containing intelligence information on the anticipated terrain height and roughness and the location and capability of the enemy threat, such as ground anti-aircraft batteries. Typically, a fixed altitude is selected in advance for the aircraft to fly above the terrain during an entire mission, based upon the roughness of the terrain, the threat information and the physical limitations of the pilot and aircraft. This fixed altitude is referred to as "set clearance altitude." Set clearance altitude is one of the parameters used to control the elevation commands which are automatically sent to the pilot or autopilot to make the aircraft climb or dive at selected flight vector angles in order to follow the contour of the terrain at an elevation near the set clearance altitude.

The elevation commands are typically determined by using a set of equations developed in the 1950's by Cornell Aeronautical Laboratories, known as the Advanced Low Altitude Technique (ADLAT). The ADLAT equations are incorporated into a computer software program on board the aircraft to generate the elevation command signals.

One of the problems associated with prior art terrain following is that the set clearance altitude is fixed during the flight or manually changed by the pilot during the flight. Thus, variations in the terrain roughness and threat probability during the flight are not taken into account to automatically adjust the set clearance altitude as needed during the flight. As a result of using a fixed set clearance altitude, the pilot and aircraft may be subjected to an unnecessarily rough flight and high risk of collision with elevated terrain at a low altitude when the threat detection probability is sufficiently low to justify flying at a higher altitude. Conversely, at other times, the aircraft may be subjected to an unreasonably high risk of enemy detection and destruction when the threat warrants flying at a lower altitude than the preselected fixed set clearance altitude.

OBJECTS OF THE INVENTION

It is, therefore, the principal object of the present invention to provide an improved apparatus and method for controlling an aircraft to fly along a predetermined path relative to the terrain below at a selected set clearance altitude.

It is another object of the invention to provide an improved apparatus and method for controlling the vertical flight vector angle of an aircraft in accordance with a selected set clearance altitude.

It is yet another object of the invention to provide an improved apparatus and method for determining the set clearance altitude for an aircraft to fly relative to the terrain below.

It is still another object of the invention to provide an apparatus and method for adjusting the set clearance altitude for an aircraft as necessary during the flight.

It is a further object of the invention to provide an apparatus and method for adjusting the set clearance altitude for an aircraft, based on variations in terrain roughness and threat detection probability during the flight.

SUMMARY OF THE INVENTION

These and other objects are accomplished in accordance with the present invention wherein an electronic apparatus is provided for controlling the vertical flight vector angle of an aircraft to fly the aircraft at a selected altitude relative to the terrain below. The apparatus is comprised of means for determining downrange distance and elevation relative to the aircraft of selected positions on terrain; means for determining a first altitude corresponding to each of the selected positions, representing the maximum altitude at which the aircraft is not subject to line-of-sight detection by a ground threat; means for determining a second altitude corresponding to each of the selected positions, representing the maximum altitude at which the aircraft is allowed to fly at the corresponding selected position; means for comparing the first and second altitudes for each selected position and generating a first electrical signal representing the lesser of the first and second altitudes for each selected position; means for comparing the lesser of the first and second altitudes with a third altitude representing the minimum altitude at which the aircraft is allowed to fly and for generating a second electrical signal representing the greater altitude as between the altitude represented by said first electrical signal and the third altitude, said second electrical signal representing the selected altitude for the corresponding selected position; and means responsive to said second electrical signal and to the respective downrange distances and elevations of said selected positions for controlling the vertical flight vector angle of the aircraft so that the aircraft flies along a path corresponding to the respective selected altitudes.

In one embodiment the means for determining downrange distance and elevation of the selected positions is comprised of an airborne radar system, which scans in elevation ahead of the aircraft with a sequence of discrete electromagnetic pulse signals to gather near range terrain elevation information and a stored terrain data base to gather terrain elevation information at greater ranges. In another embodiment the means for controlling the vertical flight vector angle of the aircraft includes means for mechanically operating an elevator device on the aircraft to control the vertical flight vector angle of the aircraft so that the aircraft flies substantially along a path corresponding to the respective selected altitudes relative to the terrain below.

In the preferred embodiment the radar system is a terrain following radar system, which measures the downrange distance and elevation of a first predetermined number (m) of the selected positions. The apparatus further includes information storage means having pre-stored therein downrange distance and elevation relative to the aircraft of a second predetermined number (n-m) of said selected positions, to provide a preselected terrain map downrange of the aircraft based on n selected positions. The second predetermined number of positions is located farther downrange of the aircraft than the first predetermined number of positions. Discrete values for the first and second altitudes, the selected altitude and the vertical flight vector angle are computed for each selected position. The maximum value of the vertical flight vector angle determined for the n number of selected positions is used to limit the operation of the elevator device so that the actual vertical flight vector angle is less than or equal to the maximum value of the vertical flight vector angle.

The selected altitude is commonly referred to as the "set clearance altitude". By adjusting the set clearance altitude during flight as a function of the probability of detection by a ground threat and the roughness of the terrain at selected positions on the terrain, a desired balance may be obtained between the altitude that must be flown in order to avoid contact with the terrain and the altitude which must be flown to avoid being "seen" by a ground threat. The pilot may also enjoy a more comfortable flight by flying at a higher altitude during portions of the flight in which the threat detection probability is relatively low.

BRIEF DESCRIPTION OF THE DRAWINGS

Other objects and advantages of the invention will be apparent from the detailed description and claims when read in conjunction with the accompanying drawings wherein:

DETAILED DESCRIPTION OF THE PREFERRED EMBODIMENT

In the description which follows, like parts are marked throughout the specification and drawings, respectively. The drawings are not necessarily to scale and in some instances proportions have been exaggerated in order to more clearly depict certain features of the invention.

Figure 1:
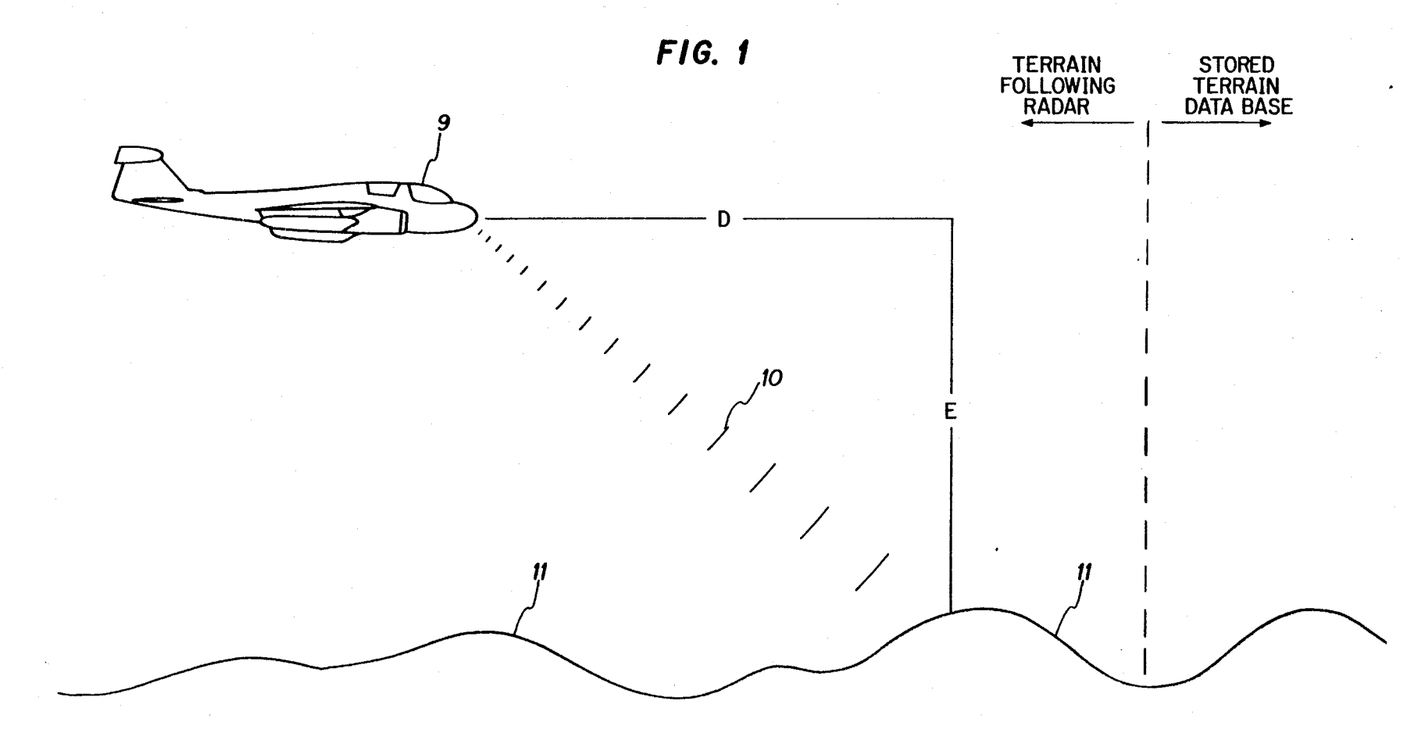
FIG. 1 is a diagram illustrating the operation of an airborne terrain following radar system and a stored terrain data base.

Referring to FIG. 1 a terrain following radar and stored terrain data base are typically used on a military aircraft 9 to guide aircraft 9 along a predetermined flight path in accordance with a selected altitude relative to the terrain 11 below. A terrain following radar is a high resolution radar, which scans in elevation using a sequence of discrete electromagnetic pulse signals 10. When the radar receives the return pulse signals 10, the downrange distance D and elevation E of selected portions of terrain 11 can be determined relative to the position of the aircraft at any given time. The downrange distance D and elevation E information are used to compute the respective positions of such selected portions of terrain 11 with reference to a fixed point of origin on a Cartesian coordinate system stored in a computer on board aircraft 9. The same computation is made at greater ranges, based on the stored terrain data base. Using the stored terrain data base for computations at greater ranges enhances the survivability of the aircraft and pilot by allowing the terrain following radar to be operated at lower peak power (i.e., approximately 1KW).

Figure 2:
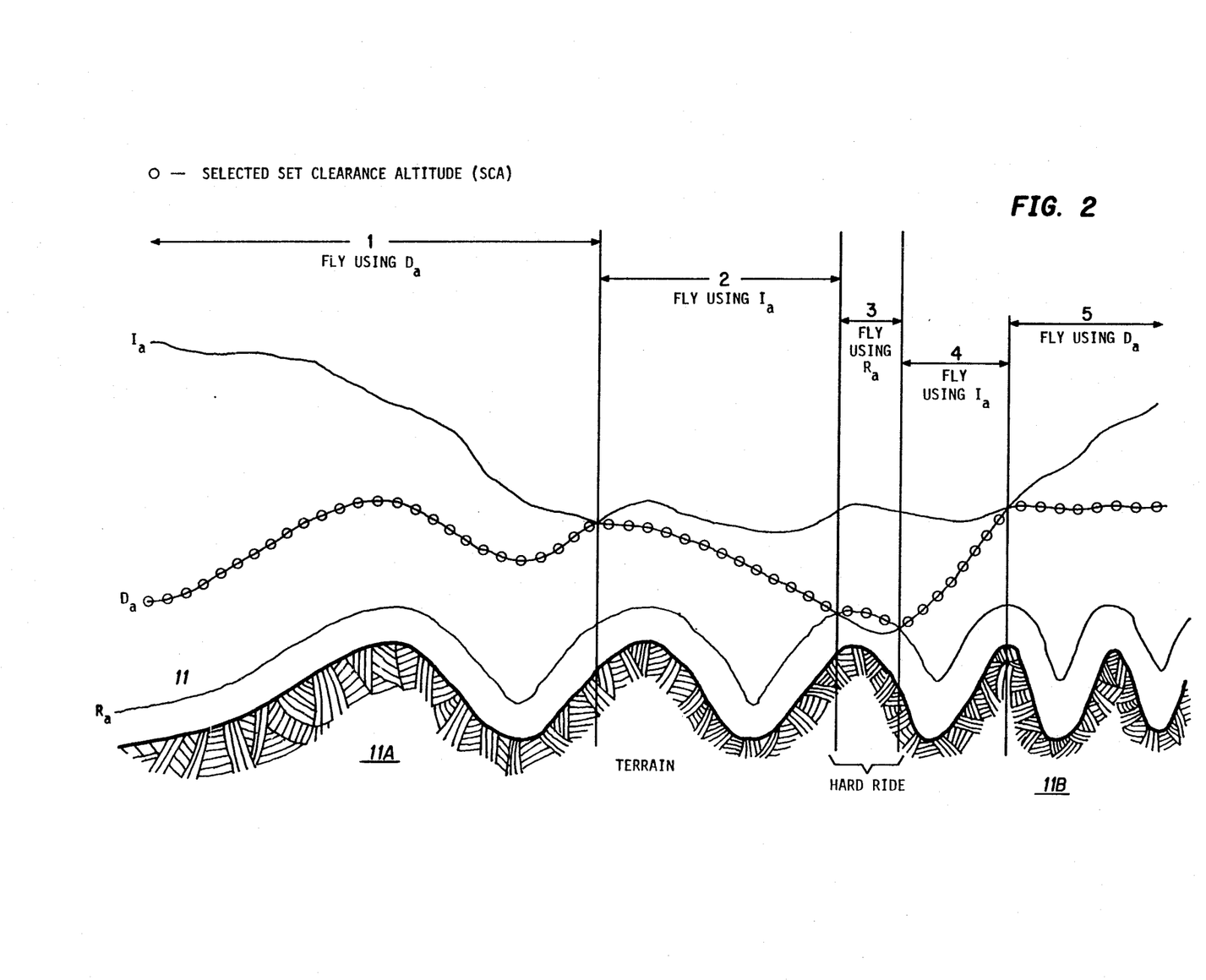
FIG. 2 is a diagram illustrating variations in the set clearance altitude of an aircraft as a function of terrain roughness and detectability of the aircraft by ground threat.

Referring to FIG. 2, terrain 11 is depicted as having a relatively smooth region 11A on the left side of the diagram and a relatively rough region 11B on the right side of the diagram. Three continuous curves labelled Ia, Da, and Ra on the left side of the drawing are illustrated, representing three different altitude functions, as will be described in greater detail hereinbelow. The circles on the drawing represent the desired flight path of the aircraft. Each circle represents a discrete value of the selected set clearance altitude (SCA) determined with reference to a corresponding selected position on terrain 11 directly below in accordance with the present invention.

The Ia curve represents an "intervisibility" factor, which is a measure of the ability of ground threats, such as an anti-aircraft ground battery, to achieve line of sight detection of the aircraft in flight. The Ia curve represents the maximum altitude at which the aircraft can fly and still be safe from detection by a ground threat at any given position (X, Y) of the aircraft. Ia is determined according to the following expression:

$$Ia = I - A1$$

where I is the maximum altitude at which the aircraft is not subject to line of sight detection by a ground threat with reference to a particular position (X, Y) or terrain 11 and A1 is a constant, such as 50 feet, to provide a safety factor to compensate for system errors. The values for I and A1 are typically stored in a data base associated with the terrain following radar, on board the aircraft. Ia is determined for each selected position on terrain 11.

The Da curve represents the desired altitude at which the aircraft is allowed to fly relative to terrain 11. Da is sometimes referred to as the "default altitude" and is computed using the following expression:

$$Da = R \times A2 + Ho$$

where R is the standard deviation of terrain elevation at a particular position on the terrain, A2 is a preselected constant coefficient, such as 1, and Ho is an initial approximation of the set clearance altitude. A2 and Ho are pre-stored in the terrain following radar data base. Da is determined for each selected position on terrain 11.

The Ra curve represents the minimum acceptable altitude for the aircraft to fly, based on the roughness of the terrain and the limitations of the aircraft. Ra is determined in accordance with the following expression:

$$Ra = MSC + A3$$

where MSC is a minimum set clearance altitude and A3 is a constant, such as 50 feet, to provide a safety factor to compensate for errors in the system. MSC and A3 are pre-stored in the terrain following radar data base.

In accordance with the present invention, a set clearance altitude is determined for each of a predetermined number of selected positions on terrain 11 by first comparing the value of Ia with the corresponding value of Da for each selected position and comparing the lesser of these two values with the corresponding value of Ra. The set clearance altitude for each selected position is the greater of the value of Ra as compared to the lesser of the Ia and Da values. For example, in FIG. 2 the set clearance altitude is equal to Da in Region 1 on the left side of the drawing because Da is less than Ia, but is greater than Ra. In Region 2 the intervisibility curve (Ia) is lower than the DA curve because of increased probability of threat detection, but is higher than the Ra curve so that the set clearance altitude follows the Ia curve in Region 2.

In Region 3 the threat detection probability is at its maximum, as indicated by the low point on the Ia curve. Since Ia falls below Ra, the set clearance altitude follows the Ra curve in Region 3 because the aircraft cannot fly the Ia curve. The aircraft is subject to detection by a ground threat in Region 3, which causes the control system to switch to "Hard Ride" and warns the pilot that the aircraft is subject to threat detection and that maximum vertical acceleration allowable for the aircraft will be used to maneuver the aircraft while the aircraft is in the "Hard Ride" mode.

In Region 4 the Ia curve is back above the Ra curve, but is below the Da curve, so that the set clearance altitude follows the Ia curve. Similarly, in Region 5, the Ia curve is above the Da curve so that the set clearance altitude follows the Da curve. Thus, the aircraft can fly at an altitude which is both comfortable for the pilot and safe when the aircraft is not detectable by a ground threat. As the detectability of the aircraft increases, the set clearance altitude is reduced to stay below the detection threshold, as represented by the Ia curve, unless the Ia curve falls below the Ra curve.

Figure 3:
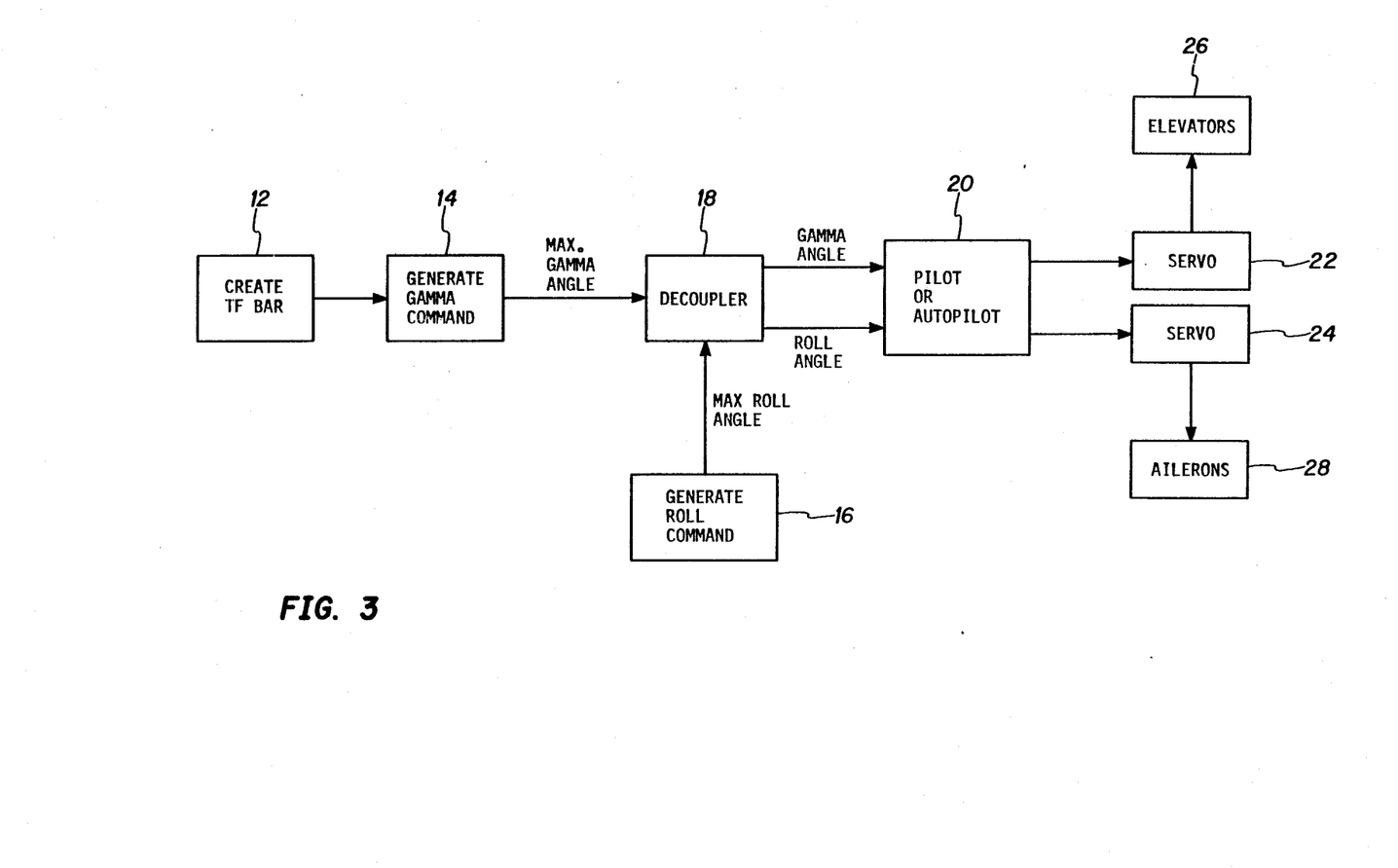
FIG. 3 is a block diagram illustrating the systems for controlling the pitch and roll of an aircraft in flight.

Referring to FIG. 3, dowrange distance (D) elevation (E) and position information (X, Y) are used to create a terrain following (TF) Bar 12, which in turn is used to generate a Gamma command 14, representing the maximum vertical flight vector angle desired for the aircraft at any given time during the flight. A roll command 16 is generated which represents the desired roll angle for the aircraft at any given time during the flight. Both the Gamma command and the roll command are fed into a decoupler 18 which adjusts the values of the Gamma angle and roll angle to arrive at an acceptable combination of Gamma and roll angle to perform a desired maneuver. This information is transmitted to the pilot, or autopilot if the aircraft is on autopilot control, as indicated at 20, which in turn operates servo units 22 and 24 for controlling elevators 26 and airlerons 28, respectively, in accordance with the Gamma angle and the roll angle commands.

Figure 4:
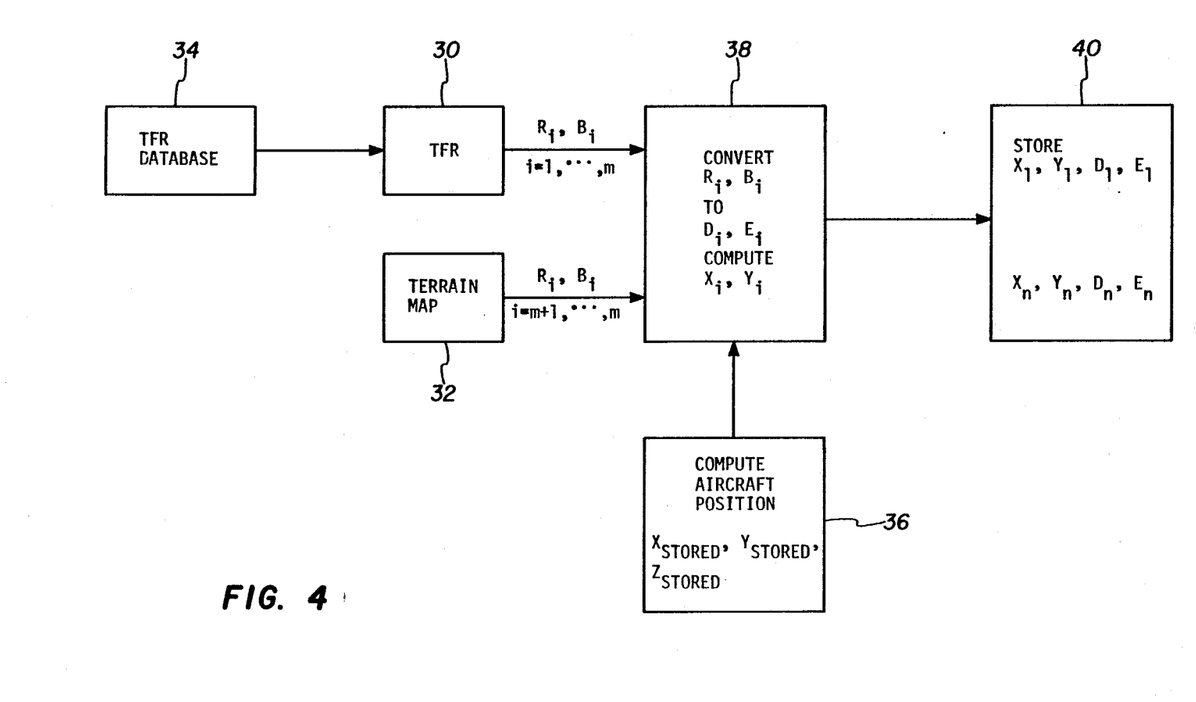
FIGS. 4 and 5 are flow diagrams illustrating the control of the vertical flight vector angle of the aircraft in accordance with the present invention.

Referring to FIG. 4 TF Bar 12 is created using information gleaned by terrain following radar (TFR) 30 and supplemented by information pre-stored in a terrain map 32. The terrain following radar (TFR) data base 34 contains information on the scan limits and gimbal limits for radar 30 for controlling the operation of radar 30 in the conventional manner. As previously described with reference to FIG. 1, reflected pulse signals from selected portions of the terrain will yield range (Ri) and angle of elevation (Bi) information for m number of discrete positions on the terrain, relative to the aircraft. During a military mission, it is often desirable to keep the transmitting power of radar 30 to a minimum to avoid counterdetection. Range (Ri) and angle of elevation (Bi) information pre-stored in terrain map 32 may be used to supplement the information gleaned by radar 30 for n-m number of selected positions on the terrain which are farther downrange than the m number of positions for which range (Ri) and angle of elevation (Bi) information are determined using radar 30. Therefore, a total of n number of selected positions on the terrain are used to create TF Bar 12.

The range between the aircraft and each selected position on the terrain (Ri) is converted to a horizontal downrange distance (Di) by solving the equation, $Di = -Ri \times \text{cosine}(Bi)$. Similarly, the elevation of each selected position relative to the aircraft (Ei) is determined by solving the equation, $Ei = Ri \times \text{sine}(Bi)$. The position of the aircraft relative to a fixed reference point (origin) in a Cartesian coordinate system (Xstored, Ystored) is determined at the time the range (Ri) and angle of elevation (Ei) are determined, using the onboard navigation system. The altitude of the aircraft (Zstored) at that time is also determined using the aircraft altimeter, relative to the fixed reference point. Using Xstored, Ystored for the aircraft, the Cartesian coordinates (Xi, Yi) for each selected position can also be determined, as indicated at 38. The Cartesian coordinates (Xi, Yi) and the downrange distance (Di) and elevation (Ei) for each of the n number of selected positions are stored in memory 40.

Figure 5:
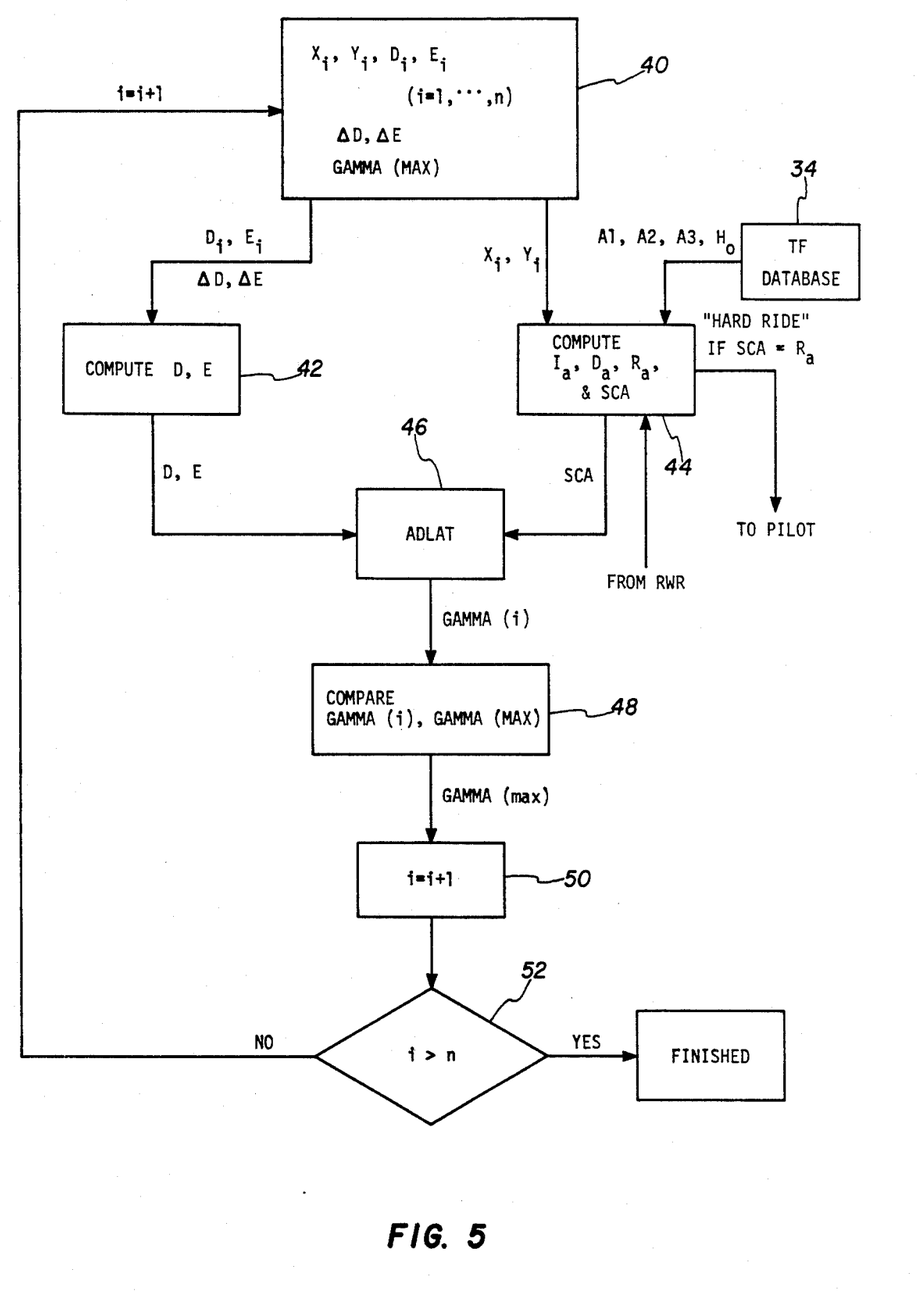

Referring to FIG. 5, the apparatus and method used to determine set clearance altitude and vertical flight vector angle for each of the n positions are depicted. Such apparatus is preferably implemented in connection with a digital computer software program, but may also be implemented in hardware. Also stored in memory 40 are the change in the downrange position ($\Delta D$) and change in elevation of the aircraft ($\Delta E$) since the time that the position of the aircraft was stored, as indicated at 36 in FIG. 4. ($\Delta D$) is computed according to the following expression:

$$D = \sqrt{(Xac - X\text{stored})^2 + (Yac - Y\text{stored})^2},$$

where Xac and Yac are the real-time Cartesian coordinates of the position of the aircraft.

Similarly, E is determined using the following expression:

$$E = Zac - Z\text{stored},$$

where Zac is the real-time Cartesian coordinate of the altitude of the aircraft.

Gamma (max.) is an initial approximation of the Gamma angle, which is purposely chosen to be very low (e.g., −99999) to ensure that all subsequently computed Gamma angles are greater than this initial angle. Beginning with the particular selected position on the terrain (i = 1) closest to the aircraft, X1, Y1, D1, E1, $\Delta D$ and $\Delta E$ are retrieved from memory 40. D1 and E1 are used along with $\Delta D$ and $\Delta E$ to compute the real time downrange distance (D) and real time elevation (E) of the first selected position relative to the aircraft in accordance with the following expression:

$$D = Di - \Delta D \text{ and } E = Ei - \Delta E,$$

as indicated at 42.

The Cartesian coordinates of the selected position (X1, Y1), together with information from TFR data base 34 and threat information from the radar warning receiver (RWR) on board the aircraft, are used to determine Ia, Da and Ra, as indicated at 44 in accordance with the following expressions:

$$Ia = I(Xi, Yi) - A1; Da = R(Xi, Yi) \times A2 + Ho; \text{ and}$$

$$Ra = MSC + A3.$$

The set clearance altitude (SCA) is determined by first comparing Ia and Da and taking the lesser of the two. The lesser of the two is then compared with the Ra value and the greater of those two values is the value used for SCA. If SCA equals RA, a "Hard Ride" signal is sent to the pilot to warn the pilot that maximum vertical acceleration will be used to manuever the aircraft. The computed values for SCA and D and E are variable inputs into the algorithm known as the Advance Low Altitude Technique (ADLAT). The ADLAT algorithm is the standard used in the industry to determine vertical flight vector angles for an aircraft in conjunction with a terrain following radar system. The ADLAT algorithm and equations are set forth in Technical Documentary Report No. AL TDR 64-145, published by AF Avionics Laboratory, Wright-Patterson Air Force Base, Ohio, August, 1964. This report is not classified and is readily available to the industry. A copy of this Report is attached hereto as Appendix I and is hereby incorporated herein by reference.

The ADLAT algorithm is used to determine a value for the vertical flight vector angle, Gamma(i), corresponding to each selected position on the terrain from i=1 to i=n, as indicated at 46. The value of Gamma(i) is compared to the previously computed maximum value of the Gamma angle, Gamma (max.), as indicated at 48, and the greater of those two values is selected as the new Gamma (max.). This is an iterative process in which the value of Gamma (max.) is continually updated until the maximum value of all the Gamma(i) values from i=1 to i=n are chosen. The value of i is then incremented by 1, as indicated at 50, and memory 40 is then addressed to retrieve pertinent information relating to the next selected position in sequence until the value of i exceeds n, as determined at 52, at which time the algorithm is completed. The maximum Gamma angle, Gamma(max.), computed for all of the n selected positions is transmitted to decoupler 18, as shown in FIG. 3, whereupon the actual Gamma angle corresponding to the actual flight vector angle is determined for controlling the aircraft elevators. One skilled in the art will recognize that the Gamma angle may be either positive (for a climb angle) or negative (for a dive angle).

In accordance with the present invention, a variable set clearance altitude is used, which is a function of the intervisibility between the aircraft and a ground-based threat and the roughness of the terrain. The set clearance altitude is a tradeoff between the altitude that must be flown to avoid "being seen" by a ground threat and the altitude that must be flown to avoid collision with the terrain. Thus, in areas where the threat is minimal, the aircraft can fly at a higher altitude which reduces the chance of collision with the terrain and provides a more comfortable flight for the pilot and aircraft. The overall survivability of the aircraft and pilot is substantially enhanced by controlling the aircraft to fly along a path corresponding to a variable set clearance altitude in accordance with the present invention.

Various embodiments of the invention have now been described in detail. Since it is obvious that many changes in and additions to the above-described preferred embodiment may be made without departing from the nature, spirit and scope of the invention, the invention is not be limited to said details, except as set forth in the appended claims.

What is claimed is:

1. An electronic apparatus for controlling the vertical flight vector angle of an inflight aircraft to fly the aircraft at selected altitudes corresponding to respective selected positions on the terrain, said apparatus comprising:

means for determining downrange distance and elevation relative to the aircraft of said selected positions on the terrain;

means for determining a first altitude corresponding to each of said selected positions, said first altitude representing the maximum altitude at which the aircraft is not subject to line-of-sight detection at the corresponding selected position by a ground threat;

means for determining a second altitude corresponding to each of said selected positions, said second altitude representing the maximum altitude at which it is desired to fly the aircraft at the corresponding selected position;

means for comparing the first and second altitudes for each selected position and for generating a first electrical signal representing the lesser of said first and second altitudes for each selected position;

means for comparing the lesser of said first and second altitudes with a third altitude representing the minimum altitude at which it is desired to fly the aircraft for each selected position and for generating a second electrical signal representing the greater altitude as between the lesser of the first and second altitudes and the third altitude, said second electrical signal being indicative of the selected altitude for the corresponding selected position; and means responsive to said second electrical signal and to the respective downrange distances and elevations of said selected positions for controlling the vertical flight vector angle of the aircraft so that the aircraft flies along a path corresponding to the respective selected altitudes.

2. The apparatus according to claim 1 wherein said means for determining downrange distance and elevation is comprised of an airborne radar system, which scans in elevation ahead of the aircraft with a sequence of discrete electromagnetic pulse signals, for measuring the downrange distance and elevation relative to the aircraft of a first predetermined number (m) of said selected positions and information storage means having pre-stored therein downrange distance and elevation relative to the aircraft of a second predetermined number (n - m) of said selected positions, to provide a preselected terrain map downrange of the aircraft based on n number of selected positions.

3. The apparatus according to claim 1 wherein said control means includes means for mechanically operating an elevator device on the aircraft to control the vertical flight vector angle of the aircraft so that the aircraft flies substantially along the path corresponding to the respective selected altitudes relative to the terrain below.

4. The apparatus according to the claim 3 wherein said control means further include means for generating a third electrical signal representing the maximum value of the vertical flight vector angle determined for the n number of selected positions, said means for operating said elevator device being responsive to said third electrical signal for limiting the actual vertical flight vector angle of the aircraft to be less than or equal to said maximum value of the vertical flight vector angle.

5. In an aircraft radar system which scans in elevation with a sequence of discrete electromagnetic pulse signals, an apparatus for determining corresponding altitudes for the aircraft to fly above respective selected positions on the terrain-below, said apparatus comprising:

means responsive to the pulse signals reflected from said selected positions on the terrain for determining the respective downrange distances and elevations of said positions relative to the aircraft;

means for determining a first altitude corresponding to each of said selected positions, said first altitude representing the maximum altitude at which the aircraft is not subject to line-of-sight detection at the corresponding selected position by a ground threat;

means for determining a second altitude corresponding to each of said selected positions, said second altitude representing the maximum altitude at which it is desired to fly the aircraft at the corresponding selected position;

means for comparing the first and second altitudes for each selected position and for generating a first electrical signal representing the lesser of said first and second altitudes for each selected position; and means for comparing the lesser of the first and second altitudes with a third altitude representing a minimum altitude at which the aircraft is allowed to fly and for generating a second electrical signal representing the greater altitude as between the altitude represented by the corresponding first electrical signal and the third altitude for each selected position, said second electrical signal being indicative of the corresponding altitude for the corresponding selected position.

6. The apparatus according to claim 5 wherein said radar system measures the downrange distance and elevation relative to the aircraft of a first predetermined number (m) of said selected positions and said radar system includes information storage means having prestored therein downrange distance and elevation relative to the aircraft of a second predetermined number (n - m) of said selected positions to provide a preselected terrain map down range of the aircraft based on n selected portions of the terrain.

7. A method for dynamically determining set clearance altitude for an aircraft to fly relative to a plurality of selected positions on the terrain below, said method comprising the steps of:

determining downrange distance and elevation of each of said selected positions relative to the aircraft;

determining a first altitude representing the maximum altitude at which the aircraft is not subject to line-of-sight detection by ground threat, for each of said selected positions;

determining a second altitude representing the maximum altitude at which it is desired to fly the aircraft, for each of said selected positions;

comparing the first and second altitudes for each selected position and generating a first electrical signal representing the lesser of said first and second altitudes for each selected position; and comparing the lesser of said first and second altitudes for each selected position with a third altitude representing the minimum altitude at which the aircraft is allowed to fly relative to the terrain below and generating a second electrical signal representing the greater altitude as between the lesser of the first and second altitudes and the third altitude, said second electrical signal being indicative of the particular set clearance altitude for the corresponding selected position.

8. The method according to claim 7 wherein said step of controlling the aircraft includes the step of mechanically operating an elevator device on the aircraft to control the vetical flight vector angle thereof.

9. The method according to claim 8 wherein the step of controlling the aircraft further includes the step of determining a desired vertical flight vector angle for each of the selected positions based on the corresponding selected altitude and comparing the computed values of the vertical flight vector angle for all of the selected positions to determine the maximum vertical flight vector angle, said elevator device being operated to limit the actual vertical flight vector angle to be less than or equal to the computed maximum vertical flight vector angle.

10. The method according to claim 7 further including the step of controlling the vertical flight vector angle of the aircraft in response to the corresponding second electrical signals at the respective selected positions and to the respective downrange distances and elevations of said selected positions to fly the aircraft substantially along a predetermined path corresponding to the respective set clearance altitudes relative to the terrain below.

11. The method according to claim 7 wherein said maximum altitude at which said aircraft is allowed to fly (Da) is a function of terrain roughness and is determined by solving the equation of $Da = R \times A2 + Ho$ where R is the standard deviation of the terrain roughness, A2 is a preselected constant and Ho is an initial approximation of the set clearance altitude.

12. The method according to claim 11 wherein said minimum altitude at which the aircraft is allowed to fly (Ra) is determined by solving the equation $Ra = MSC + A3$ where MSC is the minimum selected altitude at which the aircraft can safely fly and A3 is a predetermined constant to account for system errors.

* * * * *